United States Patent
Bolger et al.

(10) Patent No.: US 8,681,144 B2
(45) Date of Patent: Mar. 25, 2014

(54) PRIORITIZED RENDERING OF OBJECTS IN A VIRTUAL UNIVERSE

(75) Inventors: Rosa M. Bolger, Austin, TX (US); Ann Corrao, Raleigh, NC (US); Rick A. Hamilton, II, Charlottesville, VA (US); Brian M. O'Connell, Cary, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 12/339,418

(22) Filed: Dec. 19, 2008

(65) Prior Publication Data

US 2010/0156899 A1 Jun. 24, 2010

(51) Int. Cl.
*G06T 17/00* (2006.01)

(52) U.S. Cl.
USPC ............ 345/419; 715/850; 707/655

(58) Field of Classification Search
USPC .......................................... 345/419
See application file for complete search history.

(56) References Cited

U.S. PATENT DOCUMENTS

| | | | |
|---|---|---|---|
| 5,956,039 A * | 9/1999 | Woods et al. | 345/419 |
| 6,329,986 B1 * | 12/2001 | Cheng | 345/419 |
| 6,519,571 B1 | 2/2003 | Guheen et al. | |
| 7,206,785 B1 * | 4/2007 | Stephens | 707/602 |
| 8,024,343 B2 * | 9/2011 | Gallagher | 707/737 |
| 2002/0138607 A1 | 9/2002 | O'Rourke et al. | |
| 2006/0287980 A1 * | 12/2006 | Liu et al. | 707/2 |
| 2007/0179867 A1 * | 8/2007 | Glazer et al. | 705/27 |
| 2008/0098064 A1 * | 4/2008 | Sherinian | 709/203 |
| 2008/0204450 A1 | 8/2008 | Dawson et al. | |
| 2008/0208684 A1 | 8/2008 | Hamilton et al. | |
| 2008/0287192 A1 | 11/2008 | Lee et al. | |
| 2008/0307412 A1 | 12/2008 | Marr et al. | |

* cited by examiner

*Primary Examiner* — Daniel Hajnik
*Assistant Examiner* — Sultana M Zalalee
(74) *Attorney, Agent, or Firm* — William E. Schiesser; Keohane & D'Alessandro, PLLC

(57) ABSTRACT

An invention for prioritized rendering of objects in a virtual universe is provided. In one embodiment, there is a prioritization tool including a value component configured to assign a value to each of a set of items within an inventory of an avatar. A priority component is configured to compare a set of objects in the virtual universe to the value assigned to each of the set of items within the inventory of the avatar to determine a priority of each of the set of objects in the virtual universe. A rendering component is configured to render the set of objects in the virtual universe based on the priority of each of the set of objects in the virtual universe.

16 Claims, 7 Drawing Sheets

PRIORITIZED RENDERING OF OBJECTS IN A VIRTUAL UNIVERSE

FIELD OF THE INVENTION

This invention relates generally to virtual universes and more specifically to the rendering of objects in a virtual universe.

BACKGROUND OF THE INVENTION

Virtual universes or virtual worlds are computer-based simulated environments intended for its users or residents to inhabit and interact via avatars, which are personas or representations of the users of the virtual universes and generally take the form of two-dimensional or three-dimensional human or fantastical representations of a person's self. These types of virtual universes are now most common in massively multiplayer online games, such as Second Life®, which is a trademark of Linden Research Inc. in the United States. Avatars in these types of virtual universes, which can number well over a million, have a wide range of business and social experiences.

Many regions within a virtual universe contain complex environments with large numbers of objects. Prior art virtual universes only cache items worn by or attached to an avatar, or those items within a predefined proximity. Therefore, a user may experience delays when traversing regions, as objects are downloaded upon entrance or while in transit to a region.

In the prior art, after an avatar enters a region, all items surrounding the avatar must be downloaded from a server. The time to display an object varies by the size of the object and is constrained by download speed to the virtual universe client, resulting in potentially delayed rendering of objects. Since, in most cases an avatar may only interact with objects that are located within a predefined proximity, prior-art caching mechanisms begin to download objects to the local cache only after the avatar enters a region.

However, caching or pre-fetching objects by proximity does not provide an optimal experience for most users. It is common for an avatar to be first presented with objects that are not the user's primary interest. The user must wait while objects of limited interest are retrieved, cached, and processed before the region is rendered.

SUMMARY OF THE INVENTION

In one embodiment, there is a method for prioritized rendering of objects in a virtual universe. The method comprises: assigning a value to each of a set of items within an inventory of an avatar; comparing a set of objects in the virtual universe to the value assigned to each of the set of items within the inventory of the avatar to determine a priority of each of the set of objects in the virtual universe; and rendering the set of objects in the virtual universe based on the priority of each of the set of objects in the virtual universe.

In a second embodiment, there is a computer system for providing prioritized rendering of objects in a virtual universe. In this embodiment, the system comprises at least one processing unit and memory operably associated with the at least one processing unit. A prioritization tool is storable in memory and executable by the at least one processing unit. The prioritization tool comprises a value component configured to assign a value to each of a set of items within an inventory of an avatar; a priority component configured to compare a set of objects in the virtual universe to the value assigned to each of the set of items within the inventory of the avatar to determine a priority of each of the set of objects in the virtual universe; and a rendering component configured to render the set of objects in the virtual universe based on the priority of each of the set of objects in the virtual universe.

In a third embodiment, there is a computer-readable medium storing computer instructions, which when executed, enables a computer system to provide prioritized rendering of objects in a virtual universe. In this embodiment, the computer instructions comprise: assigning a value to each of a set of items within an inventory of an avatar; comparing a set of objects in the virtual universe to the value assigned to each of the set of items within the inventory of the avatar to determine a priority of each of the set of objects in the virtual universe; and rendering the set of objects in the virtual universe based on the priority of each of the set of objects in the virtual universe.

In a fourth embodiment, there is a method for deploying a prioritization tool for use in a computer system that provides prioritized rendering of objects in a virtual universe. In this embodiment, a computer infrastructure is provided and is operable to: assign a value to each of a set of items within an inventory of an avatar; compare a set of objects in the virtual universe to the value assigned to each of the set of items within the inventory of the avatar to determine a priority of each of the set of objects in the virtual universe; and render the set of objects in the virtual universe based on the priority of each of the set of objects in the virtual universe.

Figure 1:
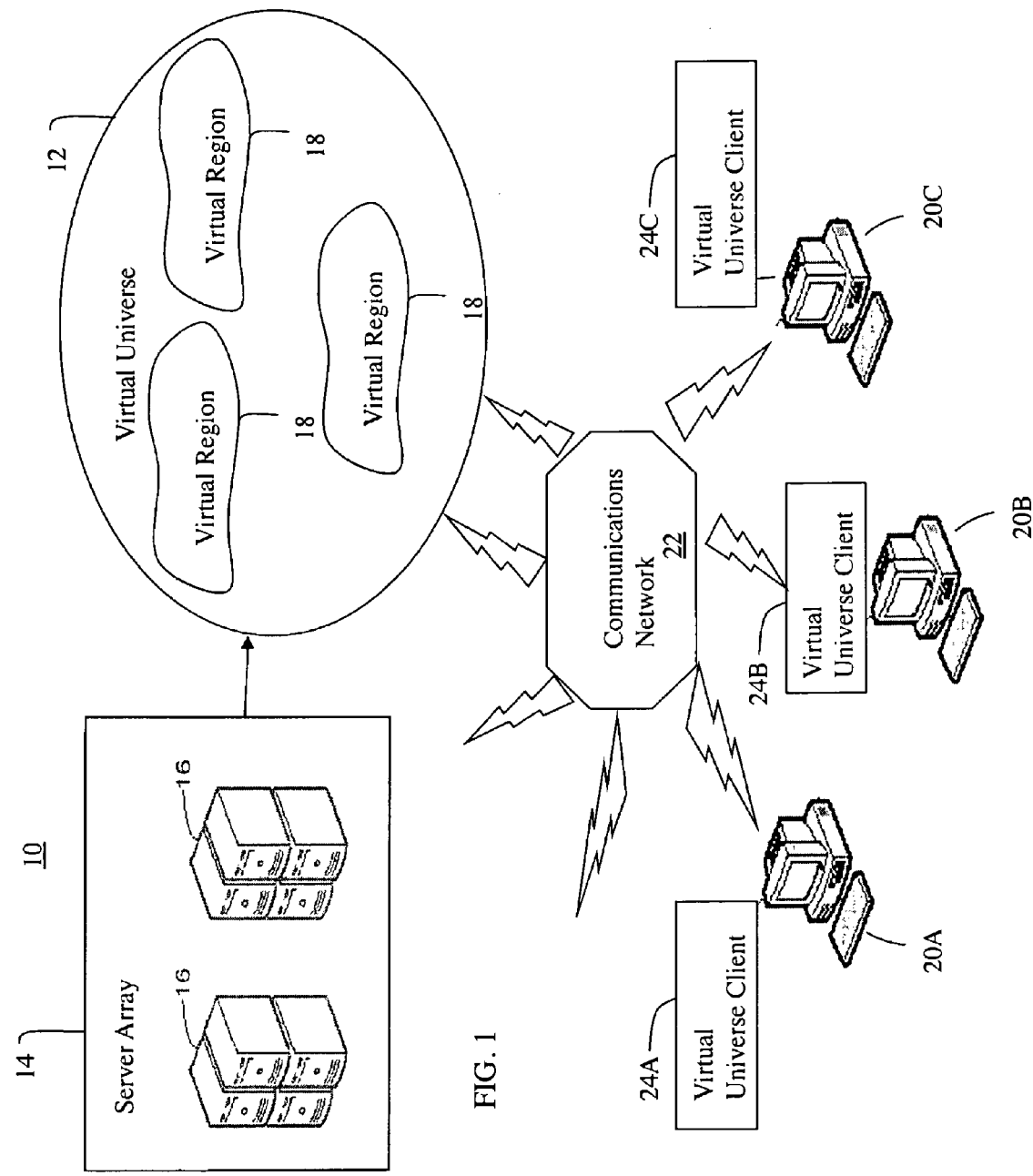
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to prioritized rendering of objects in a virtual universe, such that wait times for the rendering of objects are reduced. In these embodiments, a prioritization tool provides the capability to render the objects in the virtual universe based on a value assigned to each of a set (i.e., one or more) of items within an inventory of an avatar, such that objects in the virtual universe that are more likely to be of interest to the user are rendered first. To accomplish this, the prioritization tool compares a set of objects in the virtual universe to the value assigned to each of the set of items within the inventory of the avatar to determine a priority of each of the set of objects in the virtual universe. The prioritization tool then renders the set of objects in the virtual universe based on the priority of each of the set of objects in the virtual universe.

FIG. 1 shows a high-level schematic diagram showing a networking environment 10 for providing a virtual universe 12 according to one embodiment of this invention in which a service for prioritized rendering of objects can be utilized. As shown in FIG. 1, the networking environment 10 comprises a server array or grid 14 comprising a plurality of servers 16 each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures and scripts. Like the real-world, each virtual region 18 within virtual universe 12 comprises a landscape having objects, such as buildings, stores, clubs, sporting arenas, parks, beaches, cities and towns all created by residents of the universe that are represented by avatars. These examples of objects and virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in the computers 20, respectively. Below are further details of virtual universe 12, server array 14, and virtual universe client 24.

Figure 2:
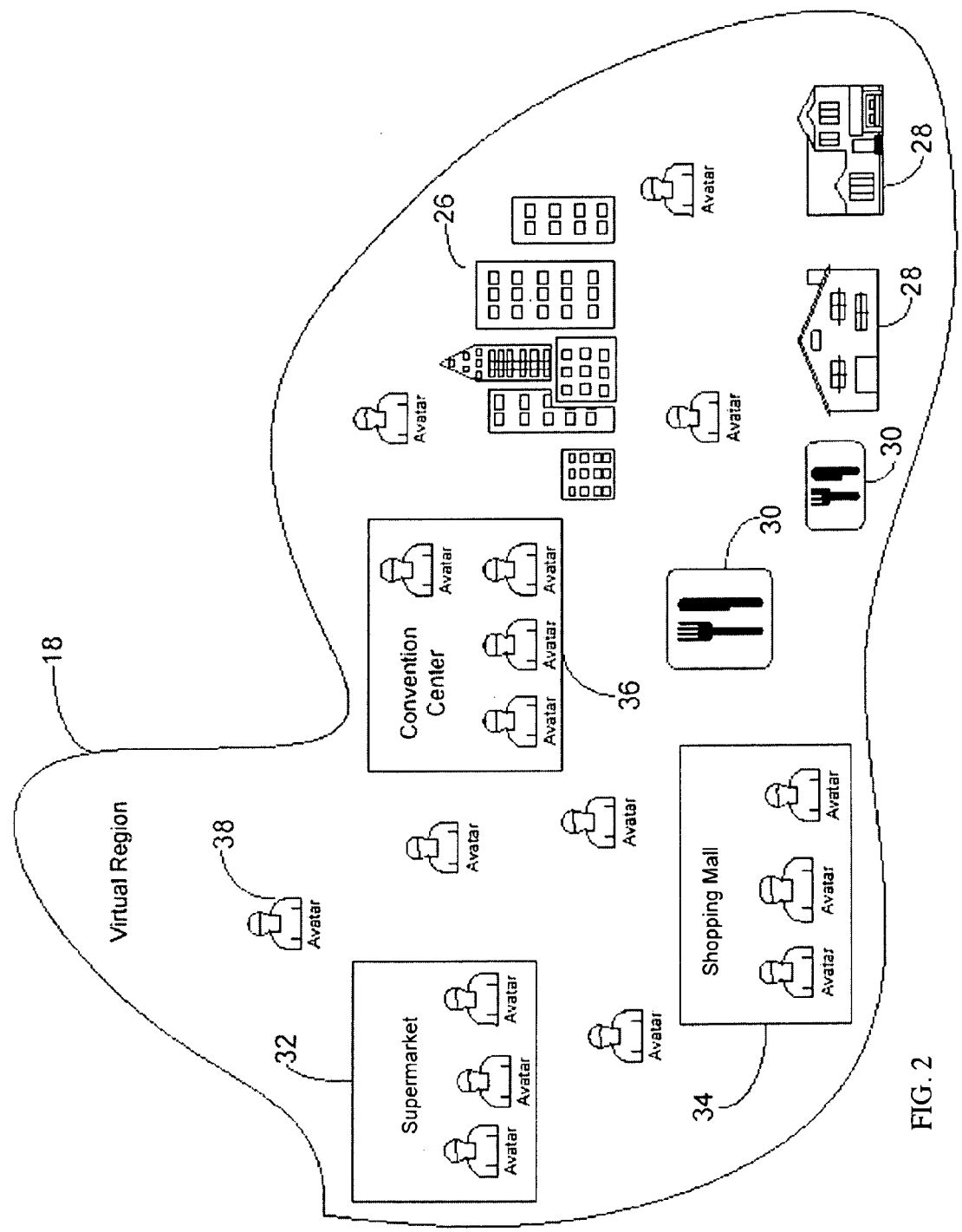
FIG. 2 shows a more detailed view of a virtual region shown in the virtual universe of FIG. 1.

FIG. 2 shows a more detailed view of what one virtual region 18 shown in virtual universe 12 of FIG. 1 may comprise. As an example, virtual region 18 shown in FIG. 2 comprises objects, including: a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, roam all about the virtual region by walking, driving, flying or even by teleportation or transportation, which is essentially moving through space from one point to another, more or less instantaneously. These examples of objects in virtual region 18 shown in FIG. 2 are only illustrative of some things that may be found in a virtual region and those skilled in the art will recognize that these regions can have many more objects that can be found in a real-life universe as well as things that do not presently exist in real life.

Figure 3:
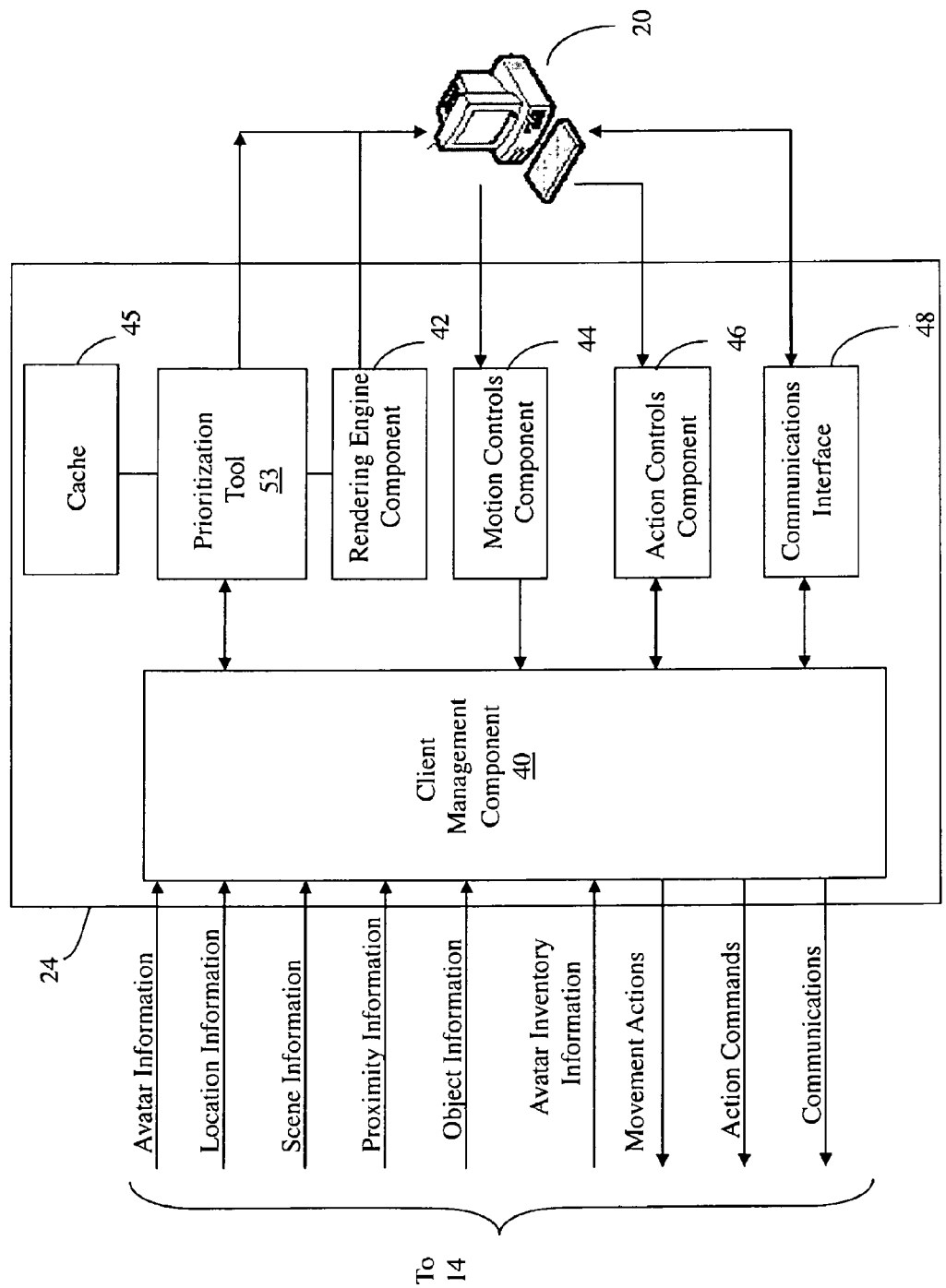
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, movements and communications made by a user through computer 20, and information received from the virtual universe through server array 14. A rendering engine component 42 enables the user of computer 20 to visualize his or her avatar within the surroundings of the particular region of virtual universe 12 that the avatar is presently located. Rendering is the process of producing the pixels of an image from a higher-level description of its components. Additionally, rendering is the process of generating an image from a model, by means of computer programs. The model is a description of three-dimensional objects in a strictly defined language or data structure. Models contain geometry, viewpoint, texture, lighting, and shading information.

A motion controls component 44 enables the user to make movements through the virtual universe. In one embodiment, movements through the virtual universe can include, for example, gestures, postures, walking, running, driving, flying, etc. An action controls component 46 enables the user to perform actions in the virtual universe, such as buying items for his or her avatar or even for their real-life selves, building homes, planting gardens, etc., as well as changing the appearance of their avatar. These actions are only illustrative of some possible actions that a user can perform in the virtual universe and are not limiting. A communications interface 48 enables a user to communicate with other users of virtual universe 12 through modalities such as chatting, instant messaging, gesturing, talking and electronic mail (e-mail).

Virtual universe client 24 further comprises a prioritization tool 53 for prioritized rendering of objects within the virtual universe, as described herein. In this embodiment, prioritization tool 53 resides on the same computer system as virtual universe client 24. However, it can be appreciated that in other embodiments, prioritization tool 53 may reside on servers 16, or reside on separate computers in direct communication with the virtual universe servers 16 and virtual universe clients 24.

A cache 45 is also provided for storing objects. As used herein, cache 45 is defined as a temporary storage area where frequently accessed data can be stored for rapid access. The data may be a collection of data duplicating original values stored elsewhere or computer earlier. Once the data is stored in the cache, future use may access the cached copy rather than re-fetching or re-computing the original data, resulting in a lower average access time. As will be further described below, objects can be pre-fetched by prioritization tool 53 and sent to cache 45 to reduce delays in the rendering of objects.

FIG. 3 shows the various types of information received by client management component 40 from the virtual universe through server array 14. In particular, client management component 40 receives location information about the area that the user's avatar is near (e.g., what region or land he or she is in) as well as scene information, including information about objects within a given region or area of the virtual universe. Client management component 40 also receives information about items within an avatar inventory 64 (FIG. 4).

Client management component 40 also receives proximity information, which contains information on what the user's avatar is near, and object information, which includes information about the objects in the virtual universe inside and outside of a rendering radius of an avatar. FIG. 3 also shows the movement actions and action commands that are generated by the user and sent to the server array via client management component 40, as well as the communications that can be sent to the users of other avatars within the virtual universe.

Figure 4:
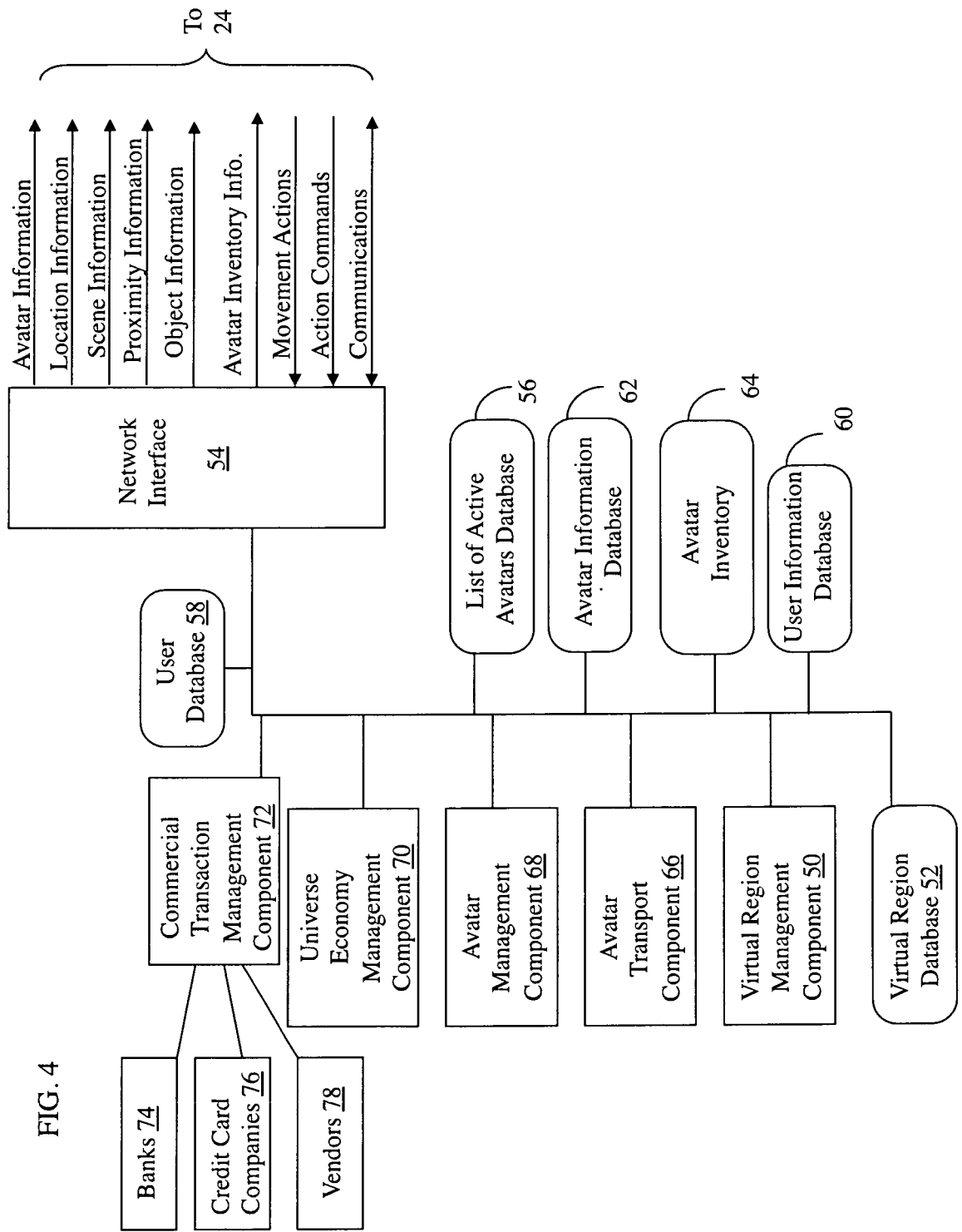
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual section within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many facets within the virtual region.

As shown in FIG. 4, there are several different databases for storing information. In particular, a virtual region database 52 stores information on all of the specifics in virtual region 18 that virtual region management component 50 is managing. Specifically, virtual region database 52 contains metadata information about the objects, texts and scripts associated with the virtual content in virtual region 18. List of active avatars database 56 contains a list of all the avatars that are online in virtual universe 12. Databases 58 and 60 contain information on the actual human users of virtual universe 12. In one embodiment, user database 58 contains general information on the users such as names, addresses, interests, ages, etc., while user information database 60 contains more sensitive information on the users such as email addresses, and billing information (e.g., credit card information) for taking part in transactions.

Databases 62 and 64 contain information on the avatars of the users that reside in virtual universe 12. Specifically, avatar information database 62 contains information such as all of the avatars that a user may have, the profile of each avatar, and avatar characteristics (e.g., appearance, voice and movement features), while avatar inventory 64 is a database that contains an inventory listing of the items within the inventory of each avatar, such as hair pieces, weapons, jewelry, houses, cars, sporting equipment, appearance, attire, etc. As virtual universes become more mainstream within business settings, it is conceivable that users may want to have public and private inventories for their avatar in order to protect unwanted discovery of confidential and proprietary information. Therefore, in one embodiment, avatar information database 62 may contain public and private inventories in order to account for various business and social encounters that need to be shielded from unauthorized parties. Those skilled in the art will recognize that databases 56-64 may contain additional information if desired. Although the above information is shown in FIG. 4 as being stored in separate databases, those skilled in the art will recognize that other database configurations and other means of storing information can be utilized.

FIG. 4 shows a network interface 54 that enables server array 14 to interact with virtual universe client 24 residing on computer 20. In particular, the network interface 54 communicates avatar, location, scene, proximity, script, object, and avatar inventory information to the user through virtual universe client 24. The network interface receives movement and action commands, as well as communications from the user via virtual universe client 24.

An avatar transport component 66 enables users to transport, which as mentioned above, allows avatars to transport through space from one point to another point, more or less instantaneously. Moving from one virtual region to a second virtual region requires the objects in the second region to be rendered as quickly as possible. As will be further described below, prioritization tool 53 of the present invention is configured to render the objects in the second region that are most likely to be important to the avatar before rendering objects that are less likely to be important to the avatar based on the items in the avatar's inventory.

An avatar management component 68 keeps track of what avatars are doing while in the virtual universe. For example, avatar management component 68 can track where each avatar is presently located in the virtual universe, as well as what activities the avatars are performing or may perform next. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 has its own currency that users pay for with real-life money. The users can then take part in commercial transactions for their avatars through universe economy management component 70. For example, an avatar might want to pay for a service that provides this prioritized rendering. In this case, the avatar would make the purchase of this service using the virtual universe currency. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not his/her avatar. In order to fulfill this type of transaction and others similarly related, commercial transaction management component 72 interacts with banks 74, credit card companies 76 and vendors 78.

Figure 5:
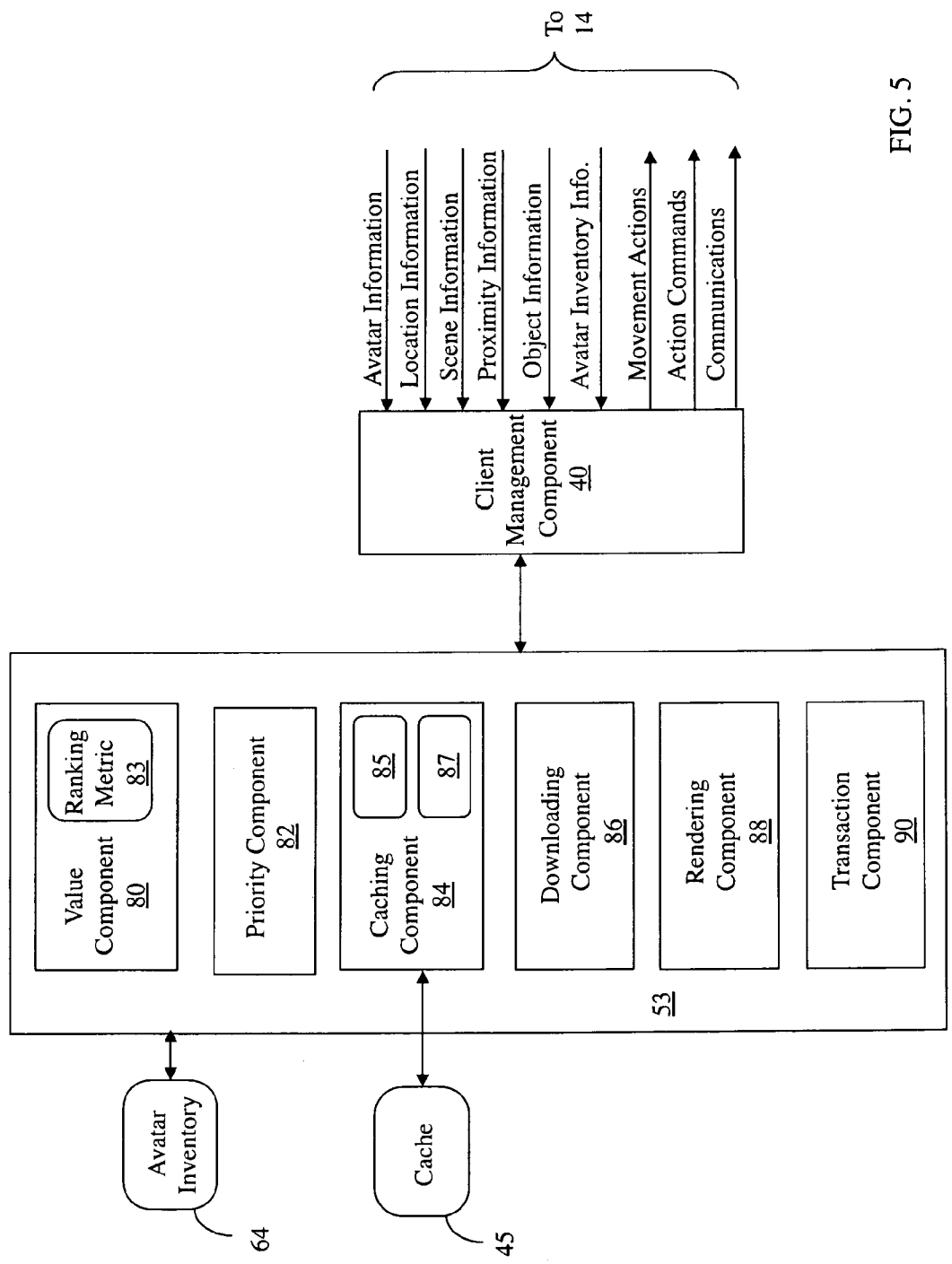
FIG. 5 shows a prioritized rendering tool according to one embodiment of this invention that operates in the environment shown in FIG. 1.

Referring now to FIG. 5, prioritization tool 53 of the present invention will be described in further detail. Specifically, prioritization tool 53 provides the capability to compare a number of objects in virtual universe 12 to the items within an inventory of avatar 38, such as avatar inventory 64, to render objects that are more likely to be important to avatar 38. To accomplish this, prioritization tool 53 comprises a value component 80 configured to assign a value to each of a set of items within the inventory of avatar 38. Value component 80 analyzes metadata associated with each of the set of items in avatar inventory 64, and ranks each of the set of items in the inventory based on the analyzed metadata. The ranking of terms within inventory metadata may be composed of multiple discrete rankings. In an exemplary embodiment, the ranking of each term is dictated by at least one of the following: a number of occurrences of each term in the inventory metadata, or an acquisition date of each term.

In one embodiment, value component 80 includes a ranking metric 83 for determining the value of each item in avatar inventory 64. Referring to the example described below, one possible ranking metric for implementing the described ranking method is shown. In Table 1, a term's rank is increased by the amount specified in the table for every occurrence within inventory metadata. In this example, the acquisition date predominately determines the rank of each term.

TABLE 1

| Acquired Date | Current month | Previous month | ... | Eleven months ago | Twelve months ago or more |
|---|---|---|---|---|---|
| Rank Increase | 12 | 11 | ... | 2 | 1 |

Consider Table 2 below, which is a depiction of a user's inventory according to this example.

TABLE 2

| Metadata Terms | Acquisition date |
|---|---|
| Football, NFL® | September 2007 |
| Jersey, NFL® | July 2007 |
| Legal Document | January 2007 |
| Legal Document | January 2007 |
| Legal Document | January 2007 |

Using the information depicted in Table 1 and Table 2, a third table is generated which contains the ranking order for metadata terms. The calculations assume the calculation month is September, 2007.

TABLE 3

| Rank | Term | Ranking order calculation |
|---|---|---|
| 1 | NFL® | 12 + 10 = 22 |
| 2 | Legal Document | 5 + 5 + 5 = 15 |
| 3 | Football | 12 = 12 |
| 4 | Jersey | 10 = 10 |

As shown above, the first term (NFL®) occurs twice in the sample inventory. (NFL® is a trademark of the National Football League in the United States.) The term occurs once for an object acquired this month, resulting in a rank increase of 12, and once with an object acquired two months ago, resulting in a rank increase of 10. Together the rank increase results in a total ranking order calculation of 22. The three objects that are eight months old (legal documents) have a total ranking order calculation of 15. Although in the above example the term "Legal Document" occurs more frequently than the term "NFL®," the acquisition date of each term gives the "NFL®" term an overall higher ranking. It can be appreciated that this example using ranking metric 83 is only illustrative of one method for determining the value of items in an inventory and is not limiting.

Referring again to FIG. 5, a priority component 82 of prioritization tool 53 is described in further detail. In an exemplary embodiment, priority component 82 is configured to compare the objects in the virtual universe to the value assigned to each of the items within avatar inventory 64 to determine a priority of each of the objects in the virtual universe. Specifically, priority component 82 collects object information from areas within the virtual universe both inside and outside of the rendering radius of avatar 38. Priority component 82 then compares metadata associated with the objects in the virtual universe to the ranked metadata associated with each item in the avatar inventory 64 to determine a priority for each of the objects in the virtual universe.

In one embodiment, when collecting object information, a caching component 84 identifies a first group of objects from the objects in the virtual universe that is outside of the rendering radius of avatar 38. The first group of objects includes objects in adjacent regions or portions of the virtual universe that avatar 38 is likely to travel to. To make sure that each of the first group of objects is discriminately rendered to the user as quickly as possible upon entrance to an adjacent area of the virtual universe outside of the rendering radius of avatar 38, the second group of objects is pre-fetched by caching component 84.

Caching component 84 downloads and caches to a cache, such as cache 45, the first group of objects based on the priority assigned to each of the first group of objects in the virtual universe. For example, consider the situation in which avatar 38 is walking through a commercial area within a virtual region, such as shopping mall 34 depicted in FIG. 2. Caching component 84 analyzes the objects just outside of the rendering radius of the avatar. In this example, the next three stores (not shown) in the shopping mall to be displayed to the avatar 38 may be a music store, a bookstore, and a jewelry store. All of the objects in the shopping mall are analyzed and compared to the items in avatar inventory 64 to determine which of the stores is most likely to be of interest to the avatar. If the inventory metadata in avatar inventory 64 indicates that avatar 38 is interested in reading, the objects associated with the bookstore are downloaded by caching component 84 and delivered to cache 45. Should avatar 38 move within the virtual universe such that the music store, the bookstore and the jewelry store are now within the avatar's rendering radius, the objects associated with the bookstore are rendered prior to the objects associated with the music store and the jewelry store.

In another embodiment, caching component 84 may be augmented to include a popularity component 85, which caches popular objects. In this embodiment, metadata for the most popular objects in the virtual universe are analyzed and compared to the avatar's ranked inventory items. The most popular items that are also highly ranked by the value component 80 are downloaded and cached for potential later use. The virtual universe may determine the most popular objects using any known analytics. For example, the most popular objects may be the objects that are most rendered, most placed in inventory, or most placed in regions.

In another embodiment, caching component 84 includes a cache expiration component 87, which expires objects that are of least interest to the user. When an object in cache 45 must be expire, due to cache size constraints, the object(s) in cache 45 that contain metadata terms without an associated ranking, or a lower ranking as determined by value component 80, are expired before objects with higher ranking metadata terms.

Further, during operation, avatar 38 may travel to a virtual region or area within the virtual universe containing no previously cached objects associated with it, such as in the event of a teleport. In this case, objects that are currently around avatar 38 must be downloaded and rendered immediately to provide an optimal viewing experience. A downloading component 86 queries the virtual universe to identify a second group of objects from the objects in the virtual universe that are inside of the rendering radius of avatar 38. Downloading component 86 downloads the second group of objects based on the priority of each of the second group of objects in the virtual universe. Unlike the first group of objects, the second group of objects is not sent to cache 45. Instead, each of the first group of objects is immediately rendered based on the relative priority of each of the second group of objects. Objects corresponding to items in avatar inventory 64 with a higher value are given priority and downloaded prior to objects corresponding to items with a lower value.

In one example, avatar 38 may wish to teleport to a new virtual region, for example, a bookstore. Assuming that the avatar has never visited the bookstore, cache 45 will contain no pre-cached objects corresponding to the bookstore. Therefore, all of the objects that make up the bookstore must be downloaded directly from a server. The objects corresponding to inventory items with a higher value are downloaded prior to the objects corresponding to items with a lower value. To accomplish this, the object metadata within the bookstore is compared to the previously computed ranking of items in avatar inventory 64. Books that are of more interest to avatar 38 are downloaded and rendered before books that are of less interest to avatar 38.

As shown in FIG. 5, prioritization tool 53 further comprises a rendering component 88 configured to render the objects in the virtual universe based on the priority of each of the objects in the virtual universe. In particular, rendering component 88 renders at least one of the following: the first group of objects from set of objects in the virtual universe within cache 45, or the second group of objects from the set of objects in the virtual universe. As described above, during operation, objects that are both inside and outside of the rendering radius of avatar 38 are compared to the previously computed ranking of items in avatar inventory 64 to render objects based on each object's priority. If a plurality of objects is to be rendered, as is typically the case, the object(s) with higher priority are rendered before those objects with lower ranking or no metadata terms. This improves the user experience, as the most likely to be used objects are rendered prior to less likely to be used objects.

In another embodiment of this invention, prioritization tool 53 is used as a service to charge fees for prioritized rendering of objects in the virtual universe. Specifically, prioritization tool comprises a transaction component 90 configured to charge a rendering fee for rendering the objects in the virtual universe based on the priority of each of the objects in the virtual universe. In this embodiment, the provider of the virtual universe or a third party service provider could offer this prioritized rendering as a service by performing the functionalities described herein on a subscription and/or fee basis. In this case, the provider of the virtual universe or the third party service provider can create, deploy, maintain, support, etc., prioritization tool 53 that performs the processes described in the invention. In return, the virtual universe or the third party service provider can receive payment from the virtual universe residents via universe economy management component 70 and commercial transaction management component 72 (FIG. 4).

In still another embodiment, the methodologies disclosed herein can be used within a computer system to provide prioritized rendering of objects in the virtual universe. In this case, prioritization tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
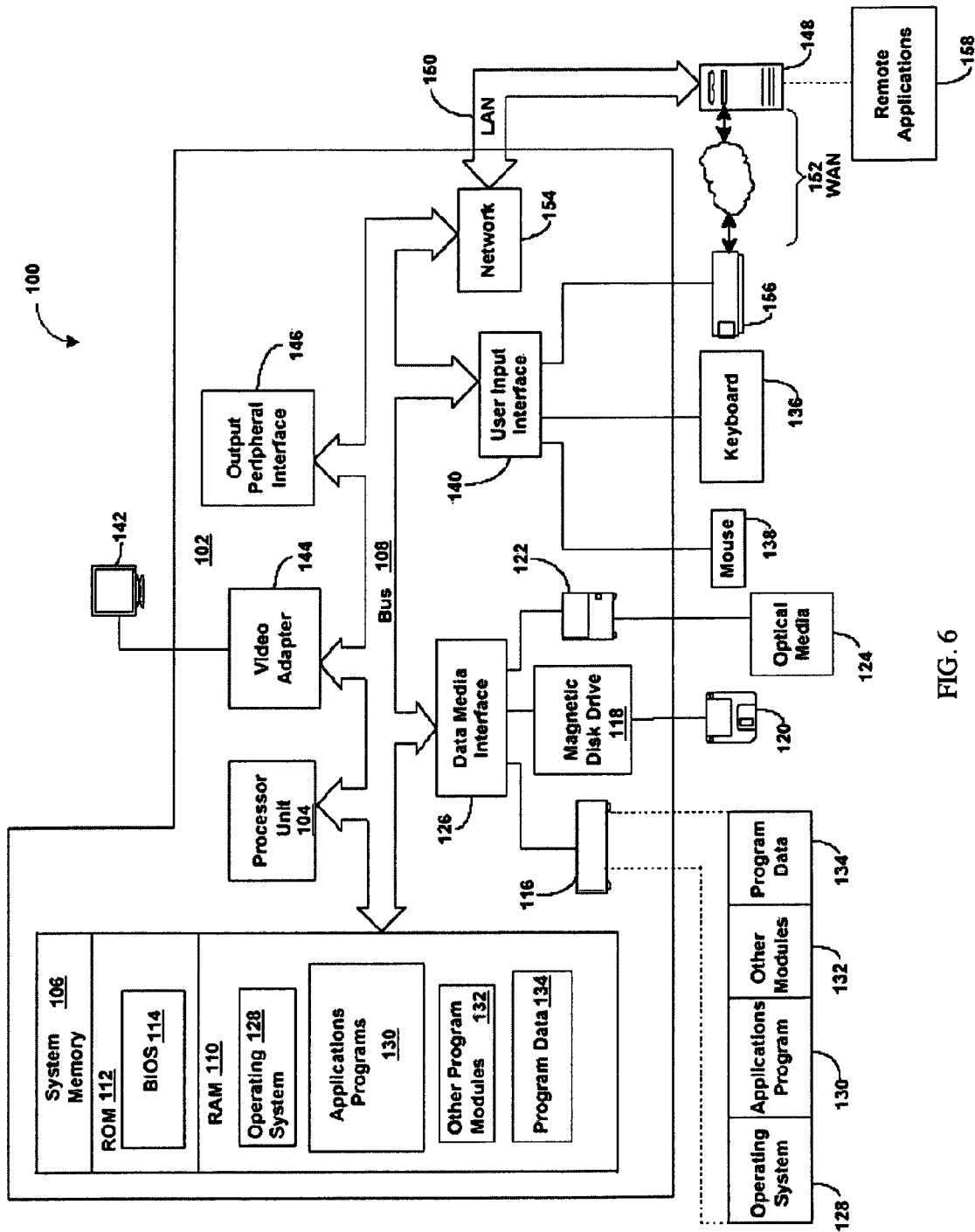
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 6.

Computing environment 100 comprises a computer 102, which is operational with numerous other general purpose or special purpose computing system environments or configurations. Examples of well known computing systems, environments, and/or configurations that may be suitable for use with computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implements particular abstract data types. Computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 188 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 188 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server array 14 and virtual universe client 24. In one embodiment, the one or more application programs 130 include components of prioritization tool 53 such as value component 80, priority component 82, caching component 84, downloading component 86, rendering component 88, and transaction component 90.

Figure 7:
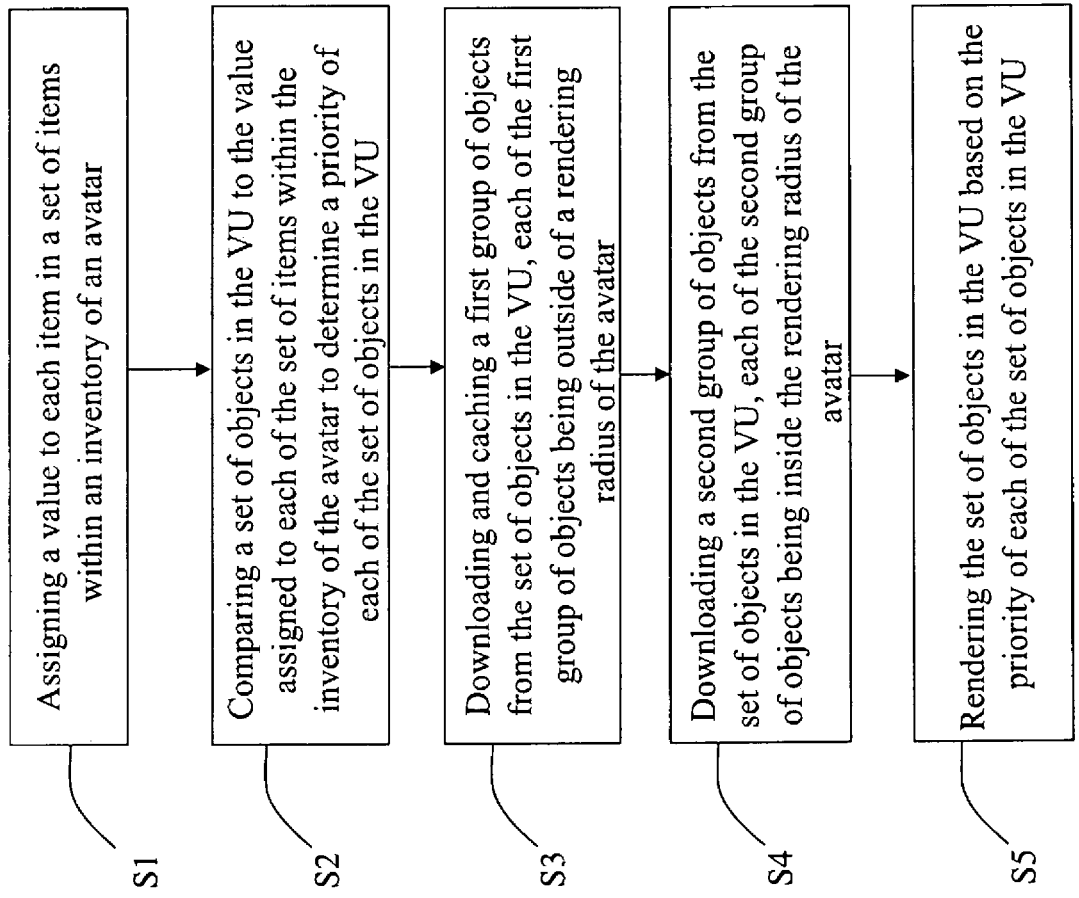
FIG. 7 shows a flow diagram of a method for prioritized rendering of objects in a virtual universe according to one embodiment of the invention.

The one or more program modules 130 carry out the methodologies disclosed herein, as shown in FIG. 7. According to one embodiment, in step S1, a value is assigned to each of the set of items within an inventory of an avatar. In S2, a set of objects in the VU is compared to the value assigned to each of the set of items within the inventory of the avatar to determine a priority of each of the set of objects in the VU. In S3, a first group of objects from the set of objects in the VU is downloaded and cached to a cache, each of the first group of objects being outside of a rendering radius of the avatar. In S4, each of the second group of objects from the set of objects in the VU is downloaded, each of the second group of objects being inside the rendering radius of the avatar. In S5, each of the set of objects in the VU is rendered based on the priority of each of the set of objects in the VU.

The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions Referring back to FIG. 6, a user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for prioritized rendering of objects in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for prioritized rendering of objects in a virtual universe, comprising:
   analyzing a set of metadata descriptors associated with a set of items within an inventory of an avatar;
   ranking each of the set of metadata descriptors based on a number of occurrences of each of the set of metadata descriptors and an acquisition date of one or more of the set of items within the inventory of the avatar associated with each of the set of metadata descriptors;
   assigning a value to each of the set of items within the inventory of an avatar based on the ranking of each of the set of metadata descriptors;
   comparing a set of objects in a commercial area of the virtual universe to the value assigned to each of the set of items within the inventory of the avatar to determine a priority of each of the set of objects in the commercial area of the virtual universe, the commercial area having a plurality of virtual retail stores;
   assigning a priority to each of the plurality of virtual stores in the commercial area based on the priority of each of the set of objects in the virtual universe;
   determining a rendering radius of the avatar traversing the commercial area of the virtual universe;
   identifying a set of virtual stores from the plurality of virtual stores in the virtual universe that is outside the rendering radius of the avatar;
   downloading and caching within a cache, each of the objects from the set of virtual stores from the plurality of virtual stores in the virtual universe that are outside the rendering radius of the avatar based on the relative priorities of each of the set of the plurality of virtual stores in the virtual universe that are outside the rendering radius of the avatar, wherein each of the objects from a first virtual store of the set of virtual stores from the plurality of virtual stores that is outside of the rendering radius of the avatar are downloaded and cached within the cache prior to any objects from a second virtual store of the set of virtual stores from the plurality of virtual stores that is outside the rendering radius of the avatar, the first virtual store having a higher priority than the second virtual store; and
   rendering the set of virtual stores in the virtual universe based on the priority of each of the set of virtual stores in the virtual universe.

2. The method according to claim 1 further comprising:
   identifying a second group of objects from the set of objects in the virtual universe that is inside the rendering radius of the avatar; and
   downloading each of the second group of objects from the set of objects in the virtual universe based on the priority of each of the second group of objects from the set of objects in the virtual universe.

3. The method according to claim 2, the rendering comprising rendering at least one of the following: a first group of objects from the set of objects in the virtual universe within the cache, or the second group of objects from the set of objects in the virtual universe.

4. The method according to claim 1 further comprising charging a rendering fee for rendering the set of objects in the virtual universe based on the priority of each of the set of objects in the virtual universe.

5. A computer system for providing prioritized rendering of objects in a virtual universe, comprising:
   at least one processing unit;
   memory operably associated with the at least one processing unit; and
   a prioritization tool storable in memory and executable by the at least one processing unit, the prioritization tool comprising:
      a value component configured to:
         analyze a set of metadata descriptors associated with a set of items within an inventory of an avatar;
         rank each of the set of metadata descriptors based on a number of occurrences of each of the set of metadata descriptors and an acquisition date of an item from the set of items associated with each of the set of metadata descriptors; and
         assign a value to each of the set of items within the inventory of an avatar based on the ranking of each of the set of metadata descriptors:
      a priority component configured to compare a set of objects in a commercial area of the virtual universe to the value assigned to each of the set of items within the inventory of the avatar to determine a priority of each of the set of objects in the commercial area of the virtual universe, the commercial area having a plurality of virtual retail stores;
      a caching component configured to:
         assign a priority to each of the plurality of virtual stores in the commercial area based on the priority of each of the set of objects in the virtual universe;
         determine a rendering radius of the avatar traversing the commercial area of the virtual universe
         identify a set of virtual stores from the plurality of virtual stores in the virtual universe that is outside the rendering radius of the avatar; and
         download and cache within a cache, each of the objects from the set of virtual stores from the plurality of virtual stores in the virtual universe that are outside the rendering radius of the avatar based on the relative priorities of each of the set of the plurality of virtual stores in the virtual universe that are outside the rendering radius of the avatar, wherein each of the objects from a first virtual store of the set of virtual stores from the plurality of virtual stores that is outside of the rendering radius of the avatar are downloaded and cached within the cache prior to any objects from a second virtual store of the set of virtual stores from the plurality of virtual stores that is outside the rendering radius of the avatar, the first virtual store having a higher priority than the second virtual store; and
      a rendering component configured to render the set of virtual stores in the virtual universe based on the priority of each of the set of virtual stores in the virtual universe.

6. The prioritization tool according to claim 5 further comprising:
   a downloading component configured to:
   identify a second group of objects from the set of objects in the virtual universe that is inside the rendering radius of the avatar; and
   download each of the second group of objects from the set of objects based on the priority of each of the second group of objects from the set of objects in the virtual universe.

7. The prioritization tool according to claim 6, the rendering component configured to render at least one of the following: a first group of objects from the set of objects in the virtual universe within the cache, or the second group of objects from the set of objects in the virtual universe.

8. The prioritization tool of claim 7 further comprising a transaction component configured to charge a rendering fee for rendering the set of objects in the virtual universe based on the priority of each of the set of objects in the virtual universe.

9. A computer-readable storage device storing computer instructions, which when executed, enables a computer system to provide prioritized rendering of objects in a virtual universe, the computer instructions comprising:
- analyzing a set of metadata descriptors associated with a set of items within an inventory of an avatar;
- ranking each of the set of metadata descriptors based on a number of occurrences of each of the set of metadata descriptors and an acquisition date associated with each of the set of metadata descriptors;
- assigning a value to each of the set of items within the inventory of an avatar based on the ranking of each of the set of metadata descriptors;
- comparing a set of objects in a commercial area of the virtual universe to the value assigned to each of the set of items within the inventory of the avatar to determine a priority of each of the set of objects in the commercial area of the virtual universe, the commercial area having a plurality of virtual retail stores;
- assigning a priority to each of the plurality of virtual stores in the commercial area based on the priority of each of the set of objects in the virtual universe;
- determining a rendering radius of the avatar traversing the commercial area of the virtual universe;
- identifying a set of virtual stores from the plurality of virtual stores in the virtual universe that is outside the rendering radius of the avatar;
- downloading and caching within a cache, each of the objects from the set of virtual stores from the plurality of virtual stores in the virtual universe that are outside the rendering radius of the avatar based on the relative priorities of each of the set of the plurality of virtual stores in the virtual universe that are outside the rendering radius of the avatar, wherein each of the objects from a first virtual store of the set of virtual stores from the plurality of virtual stores that is outside of the rendering radius of the avatar are downloaded and cached within the cache prior to any objects from a second virtual store of the set of virtual stores from the plurality of virtual stores that is outside the rendering radius of the avatar, the first virtual store having a higher priority than the second virtual store; and
- rendering the set of virtual stores in the virtual universe based on the priority of each of the set of virtual stores in the virtual universe.

10. The computer-readable storage device according to claim 9 further comprising instructions for:
- identifying a second group of objects from the set of objects in the virtual universe that is inside the rendering radius of the avatar; and
- downloading each of the second group of objects from the set of objects in the virtual universe based on the priority of each of the second group of objects from the set of objects in the virtual universe.

11. The computer-readable storage device according to claim 10 further comprising instructions for rendering at least one of the following: the first group of objects from the set of objects in the virtual universe within the cache, or the second group of objects from the set of objects in the virtual universe.

12. The computer-readable storage device according to claim 9 further comprising instructions for charging a rendering fee for rendering the set of objects in the virtual universe based on the priority of each of the set of objects in the virtual universe.

13. A method for deploying a prioritization tool for use in a computer system that provides prioritized rendering of objects in a virtual universe, comprising the computer-implemented steps to:
- analyze a set of metadata descriptors associated with a set of items within an inventory of an avatar;
- rank each of the set of metadata descriptors based on a number of occurrences of each of the set of metadata descriptors and an acquisition date associated with each of the set of metadata descriptors;
- compare a set of objects in a commercial area of the virtual universe to the value assigned to each of the set of items within the inventory of the avatar to determine a priority of each of the set of objects in the commercial area of the virtual universe, the commercial area having a plurality of virtual retail stores;
- assign a priority to each of the plurality of virtual stores in the commercial area based on the priority of each of the set of objects in the virtual universe;
- determine a rendering radius of the avatar traversing the commercial area of the virtual universe;
- identify a set of virtual stores from the plurality of virtual stores in the virtual universe that is outside the rendering radius of the avatar;
- download and cache within a cache, each of the objects from the set of virtual stores from the plurality of virtual stores in the virtual universe that are outside the rendering radius of the avatar based on the relative priorities of each of the set of the plurality of virtual stores in the virtual universe that are outside the rendering radius of the avatar, wherein each of the objects from a first virtual store of the set of virtual stores from the plurality of virtual stores that is outside of the rendering radius of the avatar are downloaded and cached within the cache prior to any objects from a second virtual store of the set of virtual stores from the plurality of virtual stores that is outside the rendering radius of the avatar, the first virtual store having a higher priority than the second virtual store; and
- render the set of virtual stores in the virtual universe based on the priority of each of the set of virtual stores in the virtual universe.

14. The method according to claim 13, further comprising the computer-implemented steps to:
- identify a second group of objects from the set of objects in the virtual universe that is inside the rendering radius of the avatar; and
- download each of the second group of objects from the set of objects in the virtual universe based on the priority of each of the second group of objects from the set of objects in the virtual universe.

15. The method according to claim 13, further comprising the computer-implemented step to render at least one of the following: a first group of objects from the set of objects in the virtual universe within the cache, or the second group of objects from the set of objects in the virtual universe.

16. The method according to claim 13, further comprising the computer-implemented step to charge a rendering fee for rendering the set of objects in the virtual universe based on the priority of each of the set of objects in the virtual universe.

* * * * *